(12) United States Patent
Idegård et al.

(10) Patent No.: US 12,241,592 B2
(45) Date of Patent: Mar. 4, 2025

(54) ARRANGEMENT FOR A CRYOGENIC SYSTEM

(71) Applicant: MAN ENERGY SOLUTIONS SVERIGE AB, Gothenburg (SE)

(72) Inventors: Andreas Idegård, Gothenburg (SE); Stefan Ågren, Gothenburg (SE); Martin Bjurlid, Pixbo (SE); Marko Parkkonen, Gothenburg (SE); Maria Bohman, Torslanda (SE)

(73) Assignee: MAN ENERGY SOLUTIONS SVERIGE AB, Gothenburg (SE)

( * ) Notice: Subject to any disclaimer, the term of this patent is extended or adjusted under 35 U.S.C. 154(b) by 10 days.

(21) Appl. No.: 18/559,863

(22) PCT Filed: Apr. 28, 2022

(86) PCT No.: PCT/EP2022/061311
§ 371 (c)(1),
(2) Date: Nov. 9, 2023

(87) PCT Pub. No.: WO2022/238129
PCT Pub. Date: Nov. 17, 2022

(65) Prior Publication Data
US 2024/0271758 A1    Aug. 15, 2024

(30) Foreign Application Priority Data
May 12, 2021 (EP) .................... 21173570

(51) Int. Cl.
*F17C 13/02* (2006.01)
*F17C 6/00* (2006.01)

(52) U.S. Cl.
CPC .............. *F17C 13/026* (2013.01); *F17C 6/00* (2013.01); *F17C 2201/0109* (2013.01);
(Continued)

(58) Field of Classification Search
CPC .. F17C 13/026; F17C 6/00; F17C 2201/0109; F17C 2201/032; F17C 2205/0326;
(Continued)

(56) References Cited

U.S. PATENT DOCUMENTS 3,030,809 A * 4/1962 Madsen ................. G01F 23/247
                                                                73/295
3,266,311 A * 8/1966 Andreasen ........... G01F 23/2967
                                                                73/290 V
(Continued)

FOREIGN PATENT DOCUMENTS

WO    2020207594 A1    10/2020

OTHER PUBLICATIONS

International Search Report (Sep. 16, 2022) for corresponding International App. PCT/EP2022/061311.

*Primary Examiner* — Craig M Schneider
*Assistant Examiner* — Christopher M Afful
(74) *Attorney, Agent, or Firm* — WRB-IP PLLC

(57) ABSTRACT

An arrangement for a cryogenic system includes a cryogenic tank for storing a cryogenic liquid and a trycock pipe, which trycock pipe has a first end mechanically connected to the cryogenic tank. The trycock pipe includes a tube with a first end fluidly connected to the cryogenic tank for receiving cryogenic liquid from the cryogenic tank. The arrangement further includes a sensor measuring the temperature of the tube. The tube has a second free end opposite to the first end of the tube, which second free end is closed, and the temperature sensor is arranged outside the tube measuring the temperature at the second free end of the tube.

12 Claims, 3 Drawing Sheets

(52) U.S. Cl.
CPC ... *F17C 2201/032* (2013.01); *F17C 2205/0326* (2013.01); *F17C 2205/0355* (2013.01); *F17C 2221/012* (2013.01); *F17C 2223/0161* (2013.01); *F17C 2250/03* (2013.01); *F17C 2250/0439* (2013.01); *F17C 2250/0486* (2013.01); *F17C 2250/0636* (2013.01)

(58) Field of Classification Search
CPC ........ F17C 2205/0355; F17C 2221/012; F17C 2223/0161; F17C 2250/03; F17C 2250/0439; F17C 2250/0486; F17C 2250/0636
USPC .......................................................... 141/1
See application file for complete search history.

(56) References Cited

U.S. PATENT DOCUMENTS

| | | | |
|---|---|---|---|
| 3,602,003 A | | 8/1971 | Hampton |
| 5,165,246 A | | 11/1992 | Cipolla et al. |
| 5,421,162 A | * | 6/1995 | Gustafson ................. F17C 9/02 62/7 |
| 5,465,583 A | * | 11/1995 | Goode .................. F17C 13/123 141/4 |
| 6,505,470 B1 | * | 1/2003 | Drube .................. F17C 13/021 62/49.2 |
| 7,926,403 B1 | | 4/2011 | Vigil et al. |
| 2005/0193743 A1 | | 9/2005 | Foss et al. |

* cited by examiner

ARRANGEMENT FOR A CRYOGENIC SYSTEM

BACKGROUND AND SUMMARY

The invention relates to an arrangement for a cryogenic system, where the arrangement comprises a cryogenic tank for storing a cryogenic liquid and a trycock pipe, and a sensor measuring the temperature of the trycock pipe.

Cryogenic systems for handling cryogenic liquids usually comprises tanks for storing liquid and equipment for filling such tanks with liquid. In a system for handling liquid hydrogen, the tank is suitably double walled and all process pipes are vacuum insulated. For this reason, each process pipe is enclosed by a secondary pipe.

When such a cryogenic tank is being filled, there is a need for detecting the level of liquid in the tank.

It is desirable to provide an arrangement for a cryogenic system, by which arrangement the temperature of a trycock pipe can be measured in a non-complicated and robust way.

According to an aspect of the invention, an arrangement for a cryogenic system is provided, where the arrangement comprises a cryogenic tank for storing a cryogenic liquid and a trycock pipe, which trycock pipe has a first end mechanically connected to the cryogenic tank, and the trycock pipe comprises a tube with a first end fluidly connected to the cryogenic tank for receiving cryogenic liquid from the cryogenic tank, where the arrangement further comprises a sensor measuring the temperature of the tube, and where the tube has a second free end opposite to the first end of the tube, which second free end is closed, and the temperature sensor is arranged outside the tube measuring the temperature at the second free end of the tube.

The invention is based on the insight that by such an arrangement, the temperature can be measured in a reliable and safe way. This in turn can be used for detecting the
   presence of cryogenic liquid. The relatively low temperature of the cryogenic liquid can be used as an indicator of the filling level of the tank.

For example, when the tank is being filled, and the liquid reaches the level of the trycock pipe, the temperature of the tube is decreased when the liquid flows into the tube. By the temperature sensor, the temperature can be measured and signals from the temperature sensor can be used for controlling the filling of the tank, such as triggering shut down of the filling, for instance.

The trycock pipe can be arranged horizontally or preferably somewhat tilted downwards, i.e. the second end of the tube is arranged lower than the first end of the tube, such that the liquid will flow from the tank into the tube due to gravity.

According to one embodiment of the arrangement, the second free end of the tube has an end wall closing the tube, where the temperature sensor is arranged to measure the temperature of the end wall, and preferably the temperature sensor is arranged to contact a surface of the end wall, such as an axial surface. Hereby, the temperature can be measured at the same time as the impact on the design of the tank and the trycock pipe due to the temperature sensor can be minimized.

According to a further embodiment of the arrangement, the temperature sensor is arranged to be assembled and disassembled to/from the trycock pipe by axially movement of the temperature sensor relative to the trycock pipe. Hereby, the assembling of the temperature sensor is facilitated and the temperature sensor can be positioned with high accuracy at the outside of the tube measuring the temperature at the second free end of the tube.

According to a further embodiment of the arrangement, the arrangement comprises an outer portion mechanically connected to a second end of the trycock pipe, where the outer portion has a through hole and the temperature sensor has a part extending axially via the through hole to the second free end of the tube, and preferably the temperature sensor is attachable to the outer portion by a screw joint. Hereby, the temperature sensor can be arranged for measuring the temperature of the tube, and the temperature sensor can be easily replaced in case of failure.

According to a further embodiment of the arrangement, the trycock pipe is an insulated double walled trycock pipe comprising the tube being a first inner tube and a second outer tube enclosing the first inner tube. In this case, the measurement of the temperature at the second free end of the first inner tube is favourable, since the temperature sensor can be positioned at the second free end, thereby avoiding a component to be arranged on the trycock pipe, which component has to pass radially through the second outer tube. This is particularly important if the first inner tube and second outer tube are vacuum tight and an annular space between an outer surface of the first inner tube and an inner surface of the second outer tube is vacuum pumped for achieving a vacuum insulated trycock pipe.

According to a further embodiment of the arrangement, the outer portion is arranged to close the second outer tube. Hereby, the number of components are minimized since in addition to enable the temperature sensor to be assembled, the outer portion can be used to make the insulated double walled trycock pipe tight.

According to a further embodiment of the arrangement, the arrangement comprises a control unit receiving signals from the temperature sensor, and the control unit is configured to provide control signals based on the received signals from the temperature sensor, for controlling filling equipment used for filling the cryogenic tank with cryogenic liquid. Hereby, the level of liquid in the tank can be detected and the control unit can be used for controlling filling level of the tank and/or filling speed.

According to a further embodiment of the arrangement, the control unit is configured to detect a temperature decrease based on the signals received from the temperature sensor and for a detected temperature decrease exceeding a predetermined setpoint value, the control unit is configured to provide control signals for shutting down the filling of the cryogenic tank. Hereby, the arrangement can be used for automatically terminating the filling, thereby avoiding overfilling of the tank.

The invention also relates to a method for controlling such an arrangement. The advantages of the method are similar to the advantages already discussed hereinabove with reference to the different embodiments of the arrangement.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
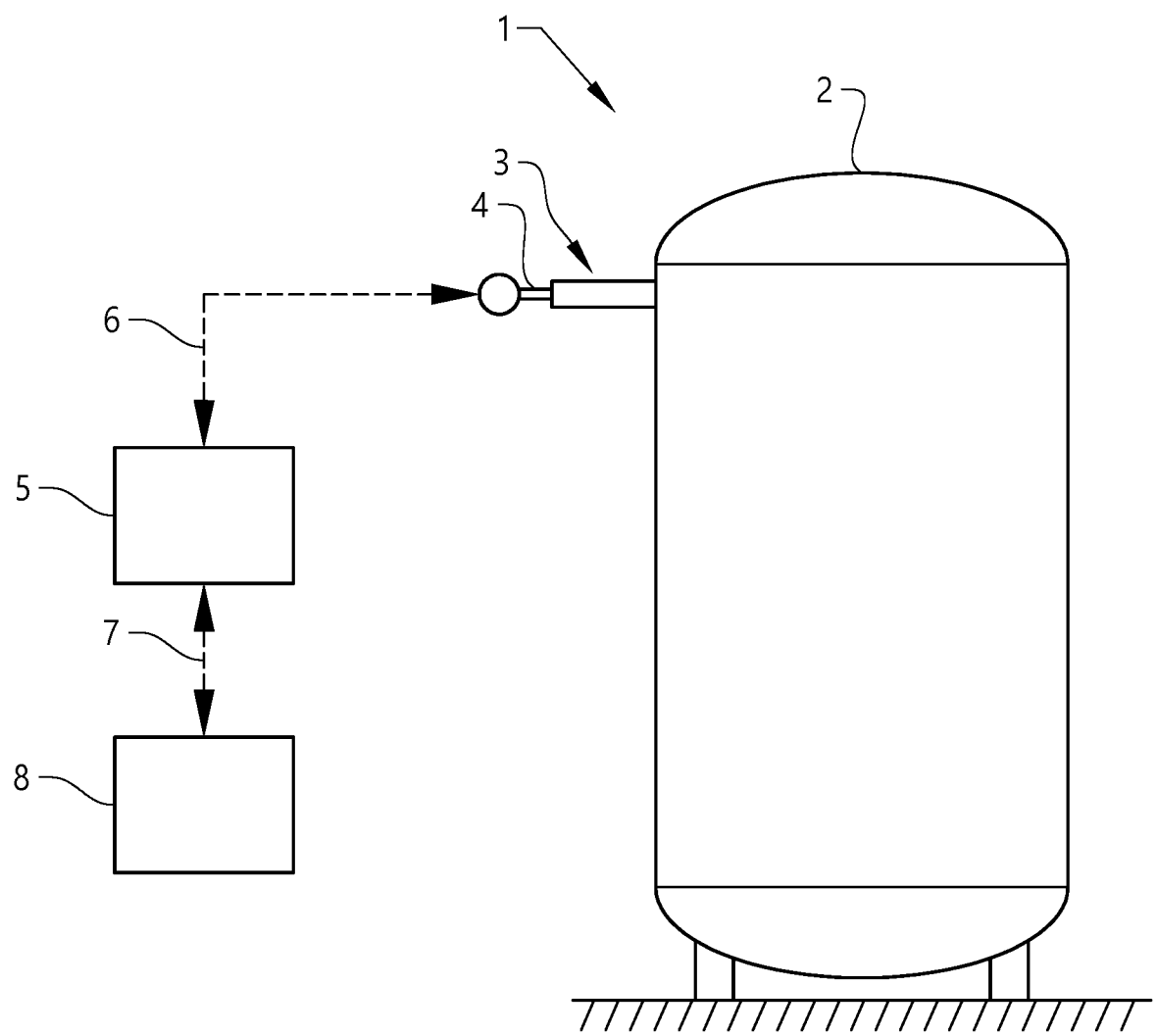
FIG. 1 shows an arrangement for a cryogenic system, which arrangement comprises a cryogenic tank for storing a cryogenic liquid and a trycock pipe.

FIG. 1 shows an arrangement 1 for a cryogenic system. The arrangement 1 comprises a cryogenic tank 2 for storing a cryogenic liquid and a trycock pipe 3 arranged on the cryogenic tank 2. The arrangement 1 further comprises a sensor 4 attached to the trycock pipe 3 for measuring a temperature of the trycock pipe 3. The temperature sensor 4 is connected to a control unit 5.

The control unit 5 receives signals 6 from the temperature sensor 4, and the control unit 5 is configured to provide control signals 7 based on the received signals 6 from the temperature sensor 4, for controlling filling equipment 8 used for filling the cryogenic tank 2 with cryogenic liquid. The filling equipment 8 is only schematically illustrated but may comprise any suitable component for filling such a cryogenic tank 2 used in the technical field of cryogenic systems.

The control unit 5 can be configured to detect a temperature decrease based on the signals 6 received from the temperature sensor 4, and for a detected temperature decrease exceeding a predetermined setpoint value, the control unit 5 can be configured to provide the control signals 7 for shutting down the filling of the cryogenic tank 2.

The control unit 5 may comprise one or more microprocessors and/or one or more memory devices or any other components for executing computer programs to perform the temperature measurements and control the filling equipment. The control unit 5 is preferably provided with a computer program comprising program code means for performing the steps of any example embodiment of the method described hereinafter.

Figure 2:
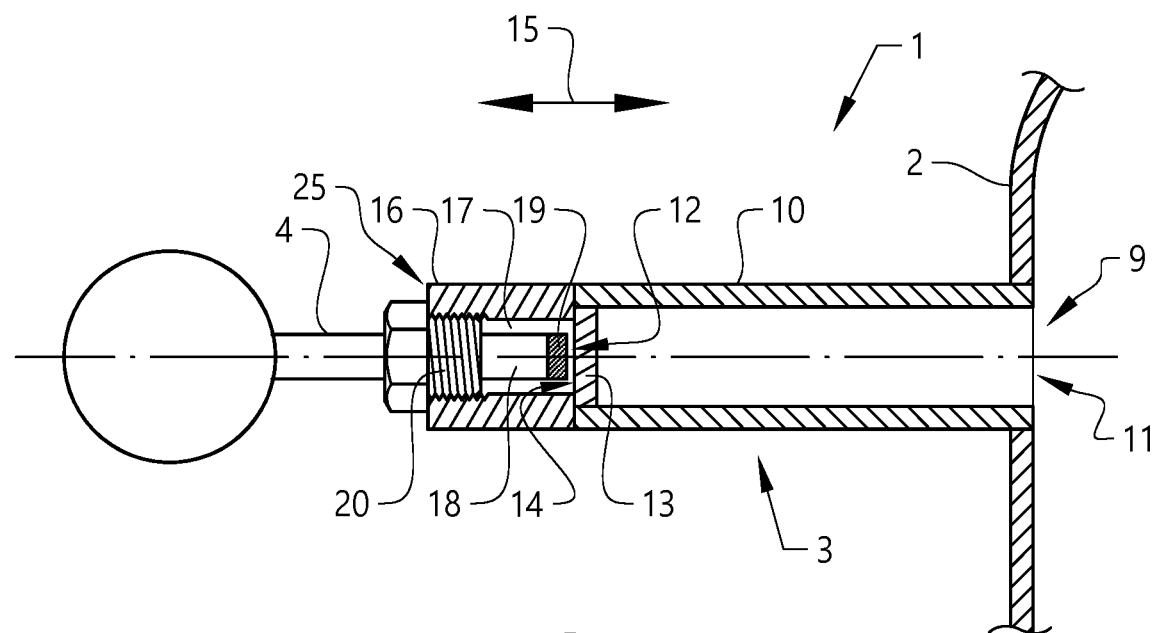
FIG. 2 is an enlarged view of the trycock pipe illustrated in FIG. 1.

FIG. 2 is an enlarged view of the trycock pipe illustrated in FIG. 1. The trycock pipe 3 is shown in a cut view. The trycock pipe 3 extending from the tank 2 has a first end 9 mechanically connected to the cryogenic tank 2. Further, the trycock pipe 3 comprises a tube 10 with a first end 11 fluidly connected to the cryogenic tank 2 for receiving cryogenic liquid from the cryogenic tank 2. In other words, when the level of liquid in the cryogenic tank 2 reaches the trycock pipe 3, liquid can flow into the tube 10 by gravity.

The arrangement 1 comprises the temperature sensor 4 for measuring the temperature of the tube 10. The tube 10 has a second free end 12 opposite to the first end 11 of the tube 10, which second free end 12 is closed. The second free end 12 is closed to the surrounding atmosphere, i.e. not fluidly connected to the atmosphere or any other receptacle. The temperature sensor 4 is arranged outside the tube 10 for measuring the temperature at the second free end 12 of the tube 10.

The second free end 12 of the tube 10 has an end wall 13 closing the tube 10, and the temperature sensor 4 is suitably arranged to measure the temperature of the end wall 13, by direct measurement of the end wall temperature or indirect measurement by measuring the temperature of the closest surrounding to the end wall 13. The temperature sensor 4 can be arranged to contact a surface 14 of the end wall 13, preferably an axial surface 14. By axial surface 14 is meant a surface with a surface normal directed substantially in parallel with the longitudinal extension direction of the tube 10.

In the example embodiment illustrated in FIG. 2, the temperature sensor 4 is arranged to be assembled to the trycock pipe 3 and disassembled from the trycock pipe 3 by axially movement of the temperature sensor 4 relative to the trycock pipe 3. The axial direction 15 indicated by an arrow, is the same direction as the longitudinal extension direction of the tube 10.

The arrangement 1 comprises an outer portion 16 which is mechanically connected to a second end 25 of the trycock pipe. The outer portion 16 is mechanically connected to the second free end 12 of the tube 10. The outer portion 16 can be connected by welding for instance. The outer portion 16 has a through hole 17 and the temperature sensor 4 has a part 18 extending axially via the through hole 17 to the second free end 12 of the tube 10. The temperature sensor 4 is arranged such that a sensing part 19 of the temperature sensor 4 is arranged at the second free end 12 of the tube 10. The outer portion 16 can be a solid portion provided with the through hole which solid portion is welded to the tube. This means that a space accommodating the sensing part 19 of the temperature sensor 4 can be created. For attachment of the temperature sensor 4 to the trycock pipe 3, the outer portion 16 and the temperature sensor 4 can be provided with screw threads, i.e. they can be connected to each other by a screw joint 20.

Figure 3:
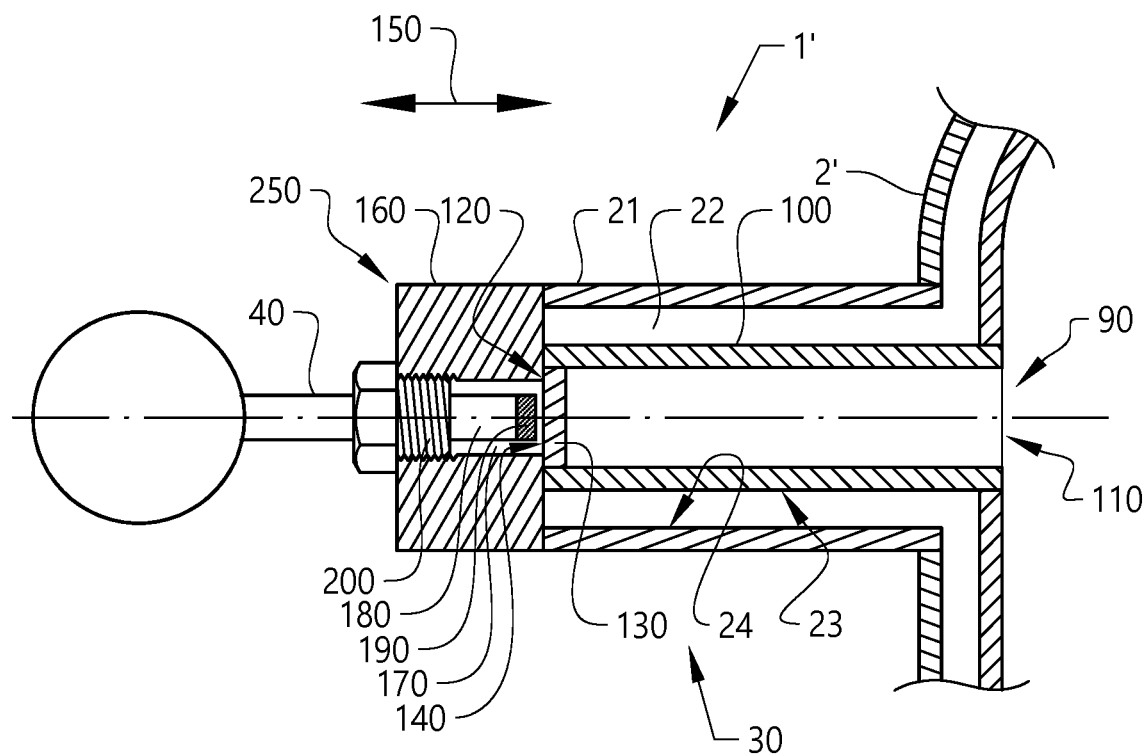
FIG. 3 shows a variant of the trycock pipe illustrated in FIG. 2.

FIG. 3 shows a further example embodiment of the arrangement 1' for a cryogenic system with a variant of the trycock pipe illustrated in FIG. 2. For this example embodiment, only components different from the example embodiment illustrated in FIG. 2 are explicitly described, and for the remaining components reference is also made to what is previously described hereinabove.

The arrangement 1' can be adapted for handling liquid hydrogen ($H_2$) by using a vacuum insulated double wall tank 2'. The trycock pipe 30 is an insulated double walled trycock pipe 30 comprising the tube being a first inner tube 100 and a second outer tube 21 enclosing the first inner tube 100. The first inner tube 100 and the second outer tube 21 are suitably vacuum tight enabling an annular space 22 between an outer surface 23 of the first inner tube 100 and an inner surface 24 of the second outer tube 21 to be vacuum pumped. In other words; the trycock pipe 30 can be a vacuum insulated double wall trycock pipe.

The arrangement 1' suitably comprises equipment (not shown) for creating vacuum in the annular space 22 between the first inner tube 100 and the second outer tube 21, such as a pump, pipe connections, valves, seals and any further component used in the technical field of cryogenic systems that is required.

In the example embodiment illustrated in FIG. 3, in addition to be mechanically connected to the second free end 120 of the first inner tube 100, the outer portion 160 is also mechanically connected to the second outer tube 21 at a second end 250 of the trycock pipe 30. The outer portion 160 can be connected by welding for instance. The outer portion 160 is arranged to close the second outer tube 21.

In a way similar to what has been described hereinabove with reference to FIG. 2, the outer portion 160 has a through hole 170 and the temperature sensor 40 has a part 180 extending axially via the through hole 170 to the second free end 120 of the first inner tube 100. The through hole 170 and the space accommodating the sensing part 190 of the temperature sensor 40 are separated from the annular space 22.

The temperature sensor 40 is arranged to be assembled to the trycock pipe 30 and disassembled from the trycock pipe 30 by axially movement of the temperature sensor 40 relative to the trycock pipe 30. The axial direction 150 indicated by an arrow, is the same direction as the longitudinal extension direction of the first inner tube 100. The temperature sensor 40 can be attachable to the outer portion 160 by the screw joint 200.

Figure 4:
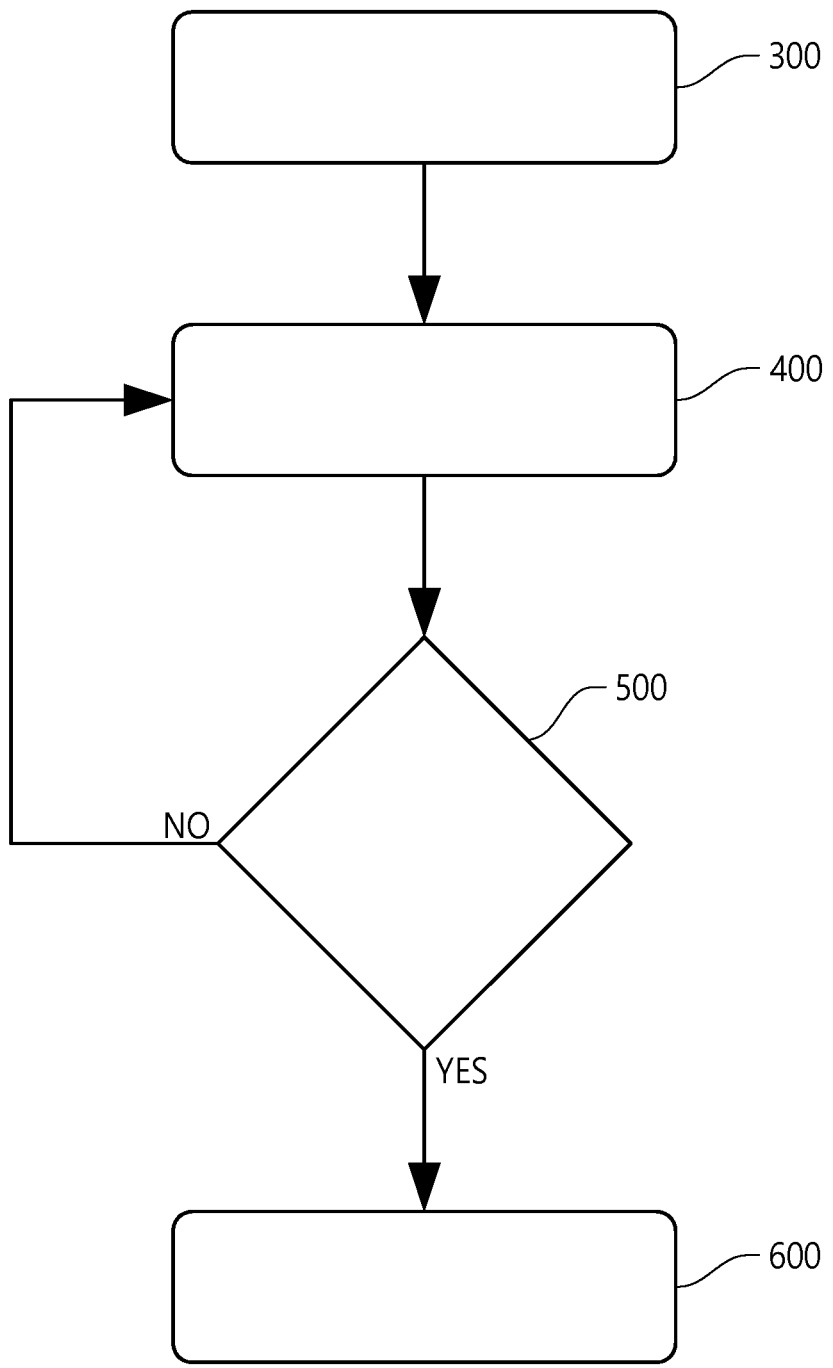
FIG. 4 shows a flow chart of a method for controlling an arrangement.

FIG. 4 shows an example embodiment of a method illustrated in a flow chart. See also FIGS. 1, 2 and 3. The method comprises the steps of measuring 300 the temperature of the tube 10; 100 outside the tube at the second free end 12; 120 of the tube, and based on the temperature measurements, controlling 600 filling equipment 8 used for filling the cryogenic tank 2; 2' with cryogenic liquid. Preferably, the method comprises the steps of detecting 400 a temperature decrease based on the temperature measurements, comparing 500 the measured temperature decrease to a predetermined setpoint or threshold value, and for a detected temperature decrease exceeding the predetermined setpoint value, i.e. "YES" in FIG. 4, controlling 600 the filling equipment 8 to shut down the filling of the cryogenic tank 2; 2', otherwise, i.e. "NO" in FIG. 4, detection of the temperature decrease is repeated.

It is to be understood that the present invention is not limited to the embodiments described above and illustrated in the drawings; rather, the skilled person will recognize that many changes and modifications may be made within the scope of the appended claims.

The invention claimed is:

1. An arrangement for a cryogenic system, the arrangement comprising a cryogenic tank for storing a cryogenic liquid a trycock pipe, the trycock pipe having a first end mechanically connected to the cryogenic tank, the trycock pipe comprising a tube with a first end fluidly connected to the cryogenic tank for receiving cryogenic liquid from the cryogenic tank, and a sensor for measuring a temperature of the tube, wherein the tube has a second free end opposite to the first end of the tube, which second free end is closed, and the temperature sensor is arranged outside the tube for measuring the temperature of the tube at the second free end of the tube, wherein the arrangement comprises a control unit receiving signals from the temperature sensor, the control unit being configured to provide control signals based on the received signals from the temperature sensor, for controlling filling equipment used for filling the cryogenic tank with cryogenic liquid.

2. An arrangement according to claim 1, wherein the second free end of the tube has an end wall closing the tube, the temperature sensor being arranged to measure the temperature of the end wall.

3. An arrangement according to claim 2, wherein the temperature sensor is arranged to contact a surface of the end wall.

4. An arrangement according to claim 1, wherein the temperature sensor is arranged to be assembled and disassembled to/from the trycock pipe by axially movement of the temperature sensor relative to the trycock pipe.

5. An arrangement according to claim 1, wherein the arrangement comprises an outer portion mechanically connected to a second end of the trycock pipe, the outer portion having a through hole and the temperature sensor having a part extending axially via the through hole to the second free end of the tube.

6. An arrangement according to claim 5, wherein the temperature sensor is attachable to the outer portion by a screw joint.

7. An arrangement according to claim 1, wherein the trycock pipe is an insulated double walled trycock pipe comprising the tube being a first inner tube and a second outer tube enclosing the first inner tube.

8. An arrangement according to claim 7, wherein the first inner tube and the second outer tube are vacuum tight enabling an annular space between an outer surface of the first inner tube and an inner surface (24) of the second outer tube to be vacuum pumped.

9. An arrangement according to claim 5, wherein the trycock pipe is an insulated double walled trycock pipe, the tube being a first inner tube and a second outer tube enclosing the first inner tube, and the outer portion is arranged to close the second outer tube.

10. An arrangement according to claim 1, wherein the control unit is configured to detect a temperature decrease based on the signals received from the temperature sensor and for a detected temperature decrease exceeding a predetermined setpoint value, the control unit is configured to provide control signals for shutting down the filling of the cryogenic tank.

11. A method for controlling an arrangement according to claim 1, comprising the steps of
measuring the temperature of the tube outside the tube at the second free end of the tube, and
based on the temperature measurements, controlling filling equipment used for filling the cryogenic tank with cryogenic liquid.

12. A method according to claim 11, comprising the steps of detecting a temperature decrease based on the temperature measurements, and for a detected temperature decrease exceeding a predetermined setpoint value, controlling the filling equipment to shut down the filling of the cryogenic tank.

* * * * *